United States Patent
Kobayashi

(10) Patent No.: US 12,217,362 B2
(45) Date of Patent: Feb. 4, 2025

(54) TEST SYSTEM AND TEST METHOD

(71) Applicant: SINTOKOGIO, LTD., Nagoya (JP)

(72) Inventor: Yuji Kobayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 32 days.

(21) Appl. No.: 17/884,619

(22) Filed: Aug. 10, 2022

(65) Prior Publication Data

US 2023/0080179 A1 Mar. 16, 2023

(30) Foreign Application Priority Data

Sep. 15, 2021 (JP) .................................. 2021-150366

(51) Int. Cl.
| | |
|---|---|
| *G06T 17/05* | (2011.01) |
| *G06T 17/20* | (2006.01) |
| *B33Y 10/00* | (2015.01) |
| *B33Y 50/02* | (2015.01) |
| *B33Y 80/00* | (2015.01) |

(52) U.S. Cl.
CPC .............. *G06T 17/05* (2013.01); *G06T 17/20* (2013.01); *B33Y 10/00* (2014.12); *B33Y 50/02* (2014.12); *B33Y 80/00* (2014.12)

(58) Field of Classification Search
CPC ......... G06T 17/05; G06T 17/20; B33Y 10/00; B33Y 50/02; B33Y 80/00; B33Y 30/00; B33Y 40/00; B33Y 40/10; B33Y 40/20; B33Y 50/00; B33Y 70/00; B33Y 70/10
See application file for complete search history.

(56) References Cited

U.S. PATENT DOCUMENTS

| | | | | |
|---|---|---|---|---|
| 6,217,816 | B1* | 4/2001 | Tang | C04B 35/622 |
| | | | | 264/434 |
| 10,118,345 | B2* | 11/2018 | Dimatteo | G05B 19/4097 |
| 10,424,001 | B1* | 9/2019 | Mishra | B33Y 50/00 |
| 10,635,088 | B1* | 4/2020 | Bandara | G05B 19/4099 |
| 10,871,471 | B1* | 12/2020 | Sanders | B33Y 30/00 |
| 10,994,490 | B1* | 5/2021 | Matusik | B29C 64/245 |
| 11,010,800 | B2* | 5/2021 | Norman | G06Q 30/0621 |
| 11,112,769 | B2* | 9/2021 | Golway | G06F 30/20 |
| 11,548,069 | B2* | 1/2023 | Mackie | B22F 10/50 |
| 11,577,347 | B2* | 2/2023 | DeMuth | B22F 10/00 |
| 11,597,153 | B1* | 3/2023 | Barbati | B22F 10/85 |
| 11,752,555 | B1* | 9/2023 | Frederick | B33Y 10/00 |
| | | | | 29/896.6 |
| 2003/0010465 | A1* | 1/2003 | Miyamoto | B21D 37/20 |
| | | | | 164/76.1 |
| 2008/0255811 | A1* | 10/2008 | Sheng | G06F 30/23 |
| | | | | 703/1 |

(Continued)

FOREIGN PATENT DOCUMENTS

JP 2016-224073 A 12/2016

*Primary Examiner* — Charles L Beard
(74) *Attorney, Agent, or Firm* — Harness, Dickey & Pierce, P.L.C.

(57) ABSTRACT

A test system includes a computer, a 3D printer, and a test device. The computer obtains shape data which indicates a three-dimensional shape of a workpiece and material data which indicates a material of the workpiece. The 3D printer forms a structural object which has a three-dimensional shape that is indicated by the shape data. The test device performs a test on a pseudo workpiece which has been prepared by adding, to the structural object, a test piece made of the material that is indicated in the material data.

3 Claims, 2 Drawing Sheets

(56) References Cited

U.S. PATENT DOCUMENTS

| | | | | |
|---|---|---|---|---|
| 2011/0282482 | A1* | 11/2011 | Knighton | B29C 64/188 700/110 |
| 2014/0324211 | A1* | 10/2014 | Sullivan | G05B 19/4097 700/182 |
| 2015/0061170 | A1* | 3/2015 | Engel | B33Y 10/00 425/135 |
| 2015/0170013 | A1* | 6/2015 | Wilson | G05B 19/188 235/468 |
| 2015/0176956 | A1* | 6/2015 | Pettersson | G01B 5/008 33/503 |
| 2015/0336331 | A1* | 11/2015 | Potter | B29C 64/153 425/169 |
| 2016/0101570 | A1* | 4/2016 | Iorio | B29C 64/393 700/98 |
| 2016/0225137 | A1* | 8/2016 | Horovitz | G06T 7/70 |
| 2016/0229120 | A1* | 8/2016 | Levine | H04N 1/00838 |
| 2016/0236416 | A1* | 8/2016 | Bheda | B33Y 50/02 |
| 2016/0257074 | A1* | 9/2016 | Levine | G05B 15/02 |
| 2016/0257075 | A1* | 9/2016 | Levine | B29C 64/386 |
| 2016/0318256 | A1* | 11/2016 | Alkhatib | B29C 64/386 |
| 2016/0337549 | A1* | 11/2016 | Nuuja | G06F 3/1222 |
| 2016/0341699 | A1* | 11/2016 | Makino | G01N 27/9046 |
| 2017/0028703 | A1* | 2/2017 | Xu | F01D 11/08 |
| 2017/0108849 | A1* | 4/2017 | Kaneko | G05B 19/408 |
| 2017/0108855 | A1* | 4/2017 | Hocker | G05B 23/0205 |
| 2017/0151716 | A1* | 6/2017 | Lu | B29C 48/15 |
| 2017/0341183 | A1* | 11/2017 | Buller | B22F 10/66 |
| 2017/0355143 | A1* | 12/2017 | Speckmann | G01N 21/00 |
| 2017/0368614 | A1* | 12/2017 | Caldicott | G05B 19/4099 |
| 2018/0001565 | A1* | 1/2018 | Hocker | G01N 23/223 |
| 2018/0071821 | A1* | 3/2018 | Crear | B22F 3/003 |
| 2018/0122061 | A1* | 5/2018 | Chatterjee | G06T 7/90 |
| 2018/0210996 | A1* | 7/2018 | Giulietti | G06F 30/17 |
| 2018/0224826 | A1* | 8/2018 | Georgi | G05B 19/404 |
| 2018/0297113 | A1* | 10/2018 | Preston | B22F 10/16 |
| 2018/0297114 | A1* | 10/2018 | Preston | B29C 64/165 |
| 2018/0304360 | A1* | 10/2018 | Fontana | B33Y 80/00 |
| 2018/0356350 | A1* | 12/2018 | Crear | G05D 9/12 |
| 2018/0370145 | A1* | 12/2018 | Woytowitz | B33Y 50/00 |
| 2019/0001574 | A1* | 1/2019 | Yackabonis | B29C 64/393 |
| 2019/0030823 | A1* | 1/2019 | McMurtry | B29C 64/153 |
| 2019/0076924 | A1* | 3/2019 | Jepeal | B33Y 70/00 |
| 2019/0118252 | A1* | 4/2019 | Bauer | B22F 3/1017 |
| 2019/0118300 | A1* | 4/2019 | Penny | B23K 26/032 |
| 2019/0126556 | A1* | 5/2019 | Levine | G05B 15/02 |
| 2019/0236489 | A1* | 8/2019 | Koudal | G06N 20/00 |
| 2019/0243338 | A1* | 8/2019 | Golway | G06F 30/20 |
| 2019/0275742 | A1* | 9/2019 | Yorozu | B33Y 40/00 |
| 2019/0286104 | A1* | 9/2019 | Sugawara | G06F 30/20 |
| 2019/0299538 | A1* | 10/2019 | Yorozu | B29C 64/106 |
| 2019/0339671 | A1* | 11/2019 | Yona | B33Y 50/02 |
| 2020/0003553 | A1* | 1/2020 | Nishi | G01B 11/2518 |
| 2020/0064809 | A1* | 2/2020 | Sanders | G06F 30/17 |
| 2020/0101534 | A1* | 4/2020 | Gibson | B33Y 10/00 |
| 2020/0156322 | A1* | 5/2020 | Yorozu | B33Y 50/02 |
| 2020/0206810 | A1* | 7/2020 | Lavi | B22F 10/22 |
| 2020/0223146 | A1* | 7/2020 | Totzeck | B29C 64/188 |
| 2020/0230886 | A1* | 7/2020 | Takano | B33Y 30/00 |
| 2020/0265122 | A1* | 8/2020 | Razzell | G06F 30/17 |
| 2020/0298499 | A1* | 9/2020 | Gupta | B33Y 50/00 |
| 2020/0307174 | A1* | 10/2020 | Woytowitz | B29C 64/393 |
| 2020/0331196 | A1* | 10/2020 | Dvash | B29C 64/106 |
| 2020/0368815 | A1* | 11/2020 | Baker | B22F 12/90 |
| 2021/0001403 | A1* | 1/2021 | Kawai | B23K 26/342 |
| 2021/0023779 | A1* | 1/2021 | Matsuda | B23K 26/144 |
| 2021/0026332 | A1* | 1/2021 | Inoue | B33Y 80/00 |
| 2021/0046672 | A1* | 2/2021 | Yoshinaga | B29B 11/12 |
| 2021/0080930 | A1* | 3/2021 | Hamaguchi | G05B 19/4099 |
| 2021/0086451 | A1* | 3/2021 | Carbone | B33Y 50/02 |
| 2021/0095056 | A1* | 4/2021 | Klun | B33Y 10/00 |
| 2021/0107215 | A1* | 4/2021 | Bauza | B29C 64/227 |
| 2021/0187835 | A1* | 6/2021 | Barnes | B29C 64/205 |
| 2021/0221030 | A1* | 7/2021 | Stoeckl | B33Y 50/00 |
| 2021/0237158 | A1* | 8/2021 | Pavan | B22F 10/85 |
| 2021/0245440 | A1* | 8/2021 | Shitrit | B29C 64/135 |
| 2021/0247325 | A1* | 8/2021 | Ong | B33Y 40/00 |
| 2021/0252791 | A1* | 8/2021 | Simon | B22F 12/90 |
| 2021/0255602 | A1* | 8/2021 | Heinrichsdorff | G05B 19/4099 |
| 2021/0276082 | A1* | 9/2021 | Herrmann | B22F 12/10 |
| 2021/0299964 | A1* | 9/2021 | Yoshigae | B22F 12/90 |
| 2021/0373528 | A1* | 12/2021 | Sanders | G05B 19/4097 |
| 2021/0402701 | A1* | 12/2021 | Vidimce | B29C 64/386 |
| 2022/0001619 | A1* | 1/2022 | Achten | B29C 51/02 |
| 2022/0088850 | A1* | 3/2022 | Twiddy | B29C 64/40 |
| 2022/0119587 | A1* | 4/2022 | Ellson | B33Y 10/00 |
| 2022/0126480 | A1* | 4/2022 | Wang | B22F 10/85 |
| 2022/0156434 | A1* | 5/2022 | Razzell | G06F 30/17 |
| 2022/0171902 | A1* | 6/2022 | Chen | G06N 3/045 |
| 2022/0176690 | A1* | 6/2022 | Vasic | B41F 15/08 |
| 2022/0193980 | A1* | 6/2022 | Thomson | B29C 64/112 |
| 2022/0197306 | A1* | 6/2022 | Cella | G06N 3/088 |
| 2022/0203618 | A1* | 6/2022 | Vasic | B33Y 50/02 |
| 2022/0203670 | A1* | 6/2022 | Vasic | B41F 15/16 |
| 2022/0226888 | A1* | 7/2022 | Giacobbi | B22F 12/50 |
| 2022/0227127 | A1* | 7/2022 | Bromberg | B33Y 30/00 |
| 2022/0242048 | A1* | 8/2022 | Tanchak | B22F 12/90 |
| 2022/0250330 | A1* | 8/2022 | Cohen Azaria | B29C 64/112 |
| 2022/0258462 | A1* | 8/2022 | Vasic | B29C 64/205 |
| 2022/0276043 | A1* | 9/2022 | Kakuta | B29C 64/386 |
| 2022/0288844 | A1* | 9/2022 | Ferris Roig | B29C 64/194 |
| 2022/0305737 | A1* | 9/2022 | Mitake | B33Y 80/00 |
| 2022/0308562 | A1* | 9/2022 | Norman | G05B 19/4097 |
| 2022/0324170 | A1* | 10/2022 | Reith | H04L 67/306 |
| 2022/0362853 | A1* | 11/2022 | Ferreri | B22F 10/36 |
| 2022/0375684 | A1* | 11/2022 | Wolf | B29C 64/00 |
| 2022/0379380 | A1* | 12/2022 | Sanders | G05B 19/4099 |
| 2023/0003671 | A1* | 1/2023 | Turner | G01N 23/04 |
| 2023/0037539 | A1* | 2/2023 | Praharaj | B22F 10/22 |
| 2023/0041509 | A1* | 2/2023 | Behandish | G05B 19/4188 |
| 2023/0063669 | A1* | 3/2023 | Mohr | B22F 10/64 |
| 2023/0076556 | A1* | 3/2023 | Goyal | B29C 64/188 |
| 2023/0088537 | A1* | 3/2023 | Harris | G05B 19/40938 700/99 |
| 2023/0091230 | A1* | 3/2023 | Kalpio | B29C 64/245 264/401 |
| 2023/0099420 | A1* | 3/2023 | Hutchinson | B33Y 80/00 264/30 |
| 2023/0106552 | A1* | 4/2023 | Cohee | G06F 30/12 703/6 |
| 2023/0136313 | A1* | 5/2023 | Buckby | B29C 64/255 |
| 2023/0150026 | A1* | 5/2023 | Sheflin | B22D 23/003 164/133 |
| 2023/0150200 | A1* | 5/2023 | Goldman | G02F 1/133528 264/494 |
| 2023/0152008 | A1* | 5/2023 | Brewer | F24S 80/20 126/569 |
| 2023/0166457 | A1* | 6/2023 | Wiedemann | B29C 64/393 700/118 |
| 2023/0173545 | A1* | 6/2023 | Bosveld | B29C 64/379 209/576 |
| 2023/0177224 | A1* | 6/2023 | Weiss | G06F 30/23 703/1 |
| 2023/0211561 | A1* | 7/2023 | Agarwal | B33Y 50/00 700/98 |
| 2023/0242697 | A1* | 8/2023 | Nishiura | C08F 226/06 522/96 |
| 2023/0256513 | A1* | 8/2023 | Totzeck | B33Y 30/00 |
| 2023/0256683 | A1* | 8/2023 | Jacimovic | B22F 10/60 700/118 |
| 2023/0271386 | A1* | 8/2023 | Zhu | B29C 64/209 264/40.1 |
| 2023/0294173 | A1* | 9/2023 | Freytag | G05B 23/0243 700/118 |
| 2023/0294201 | A1* | 9/2023 | Niu | B22F 10/85 219/76.1 |
| 2023/0294215 | A1* | 9/2023 | Tamura | B33Y 40/00 219/121.64 |
| 2023/0311410 | A1* | 10/2023 | Korten | B29C 64/171 264/401 |
| 2023/0314295 | A1* | 10/2023 | Storck | B33Y 10/00 73/841 |

(56) References Cited

U.S. PATENT DOCUMENTS

| | | | |
|---|---|---|---|
| 2023/0324170 A1* | 10/2023 | Renwick | B29C 64/209 |
| | | | 356/601 |
| 2023/0330941 A1* | 10/2023 | Widulle | B29C 64/295 |
| 2023/0331890 A1* | 10/2023 | Kirsankina | C08F 222/1025 |
| 2024/0042699 A1* | 2/2024 | Herrmann | B29C 64/209 |
| 2024/0082923 A1* | 3/2024 | Tracy | B23K 35/0244 |
| 2024/0181708 A1* | 6/2024 | Washizu | B29C 64/393 |
| 2024/0278505 A1* | 8/2024 | Fox | B33Y 50/00 |

\* cited by examiner

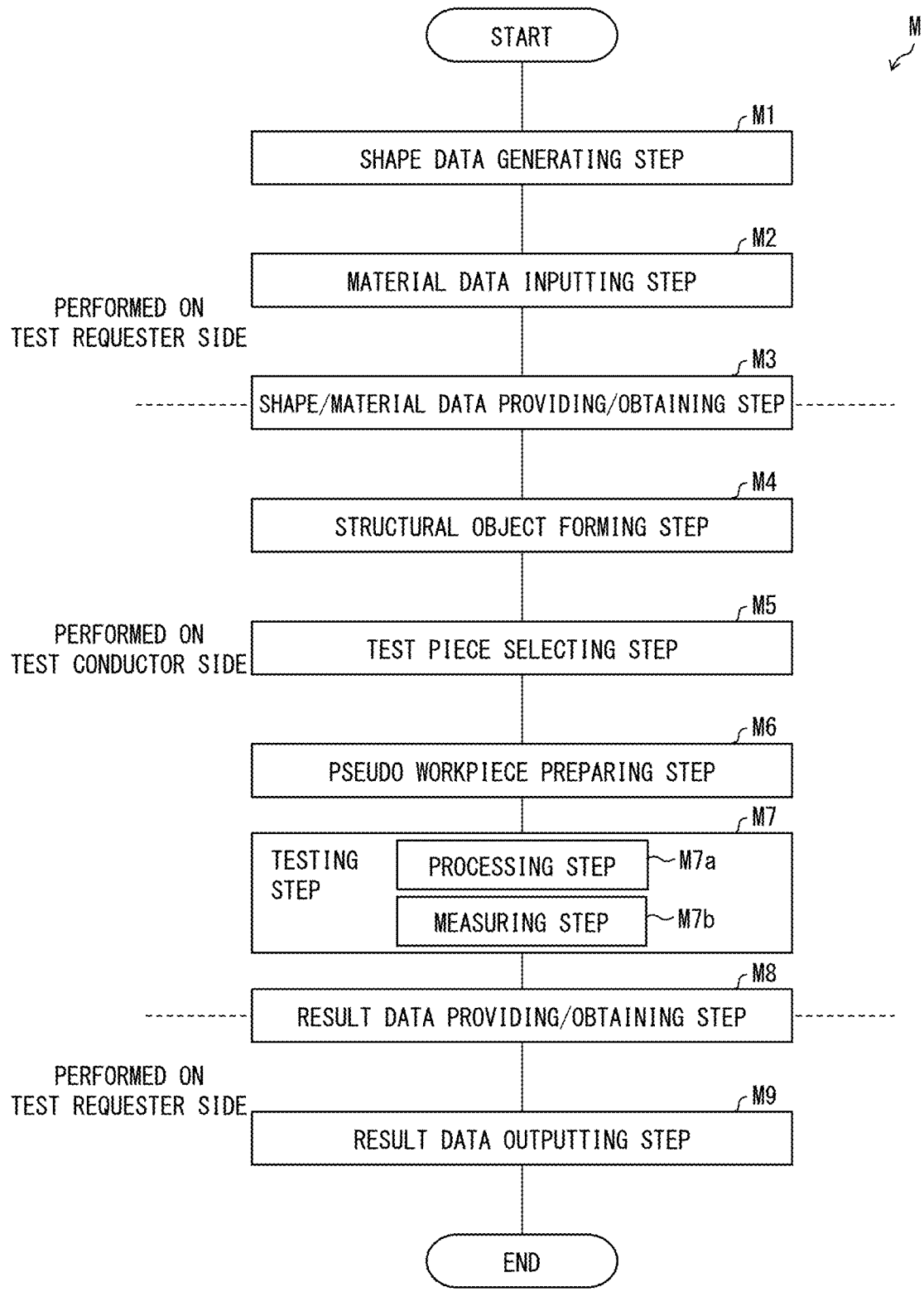

TEST SYSTEM AND TEST METHOD

This Nonprovisional application claims priority under 35 U.S.C. § 119 on Patent Application No. 2021-150366 filed in Japan on Sep. 15, 2021, the entire contents of which are hereby incorporated by reference.

TECHNICAL FIELD

The present invention relates to a test system and a test method each of which is for performing a test on a workpiece.

BACKGROUND ART

Various types of surface processing, for example, blasting such as shot blasting and micro blasting, peening such as shot peening and laser peening, polishing such as barrel polishing and brush polishing, and burnishing such as roller burnishing, have been put to practical use. In order to achieve high-quality surface processing, a technique for performing a test of a surface condition of a workpiece after processing is crucial. Examples of the surface condition to be checked in the test include roughness, hardness, residual stress, and crystal grain size. For example, Patent Literature 1 discloses a surface property test device for electrically performing a test of residual stress and the like of a surface-processed workpiece.

CITATION LIST

Patent Literature

[Patent Literature 1]
Japanese Patent Application Publication Tokukai No. 2016-224073

SUMMARY OF INVENTION

Technical Problem

In order to perform a test of the surface condition of a workpiece after processing, a measuring device in accordance with a purpose of surface processing is necessary. Accordingly, for example, a user who has a processing device but does not have a measuring device needs to ask, for example, a manufacturer of the processing device to perform such a test on a workpiece. However, such remote testing has a problem in that labor, time and cost are required for transporting the workpiece from a test requester, who asks for performing a test, to a test conductor, who conducts the test. As a possible measure against the problem, for example, a part of the workpiece may be transported from the test requester to the test conductor, or the test conductor may prepare a test piece which is made of the same material as the workpiece. However, in this case, there is a problem in that the test cannot be conducted in consideration of the shape of the workpiece. Similar problems may occur in the various types of processing other than surface processing.

An aspect of the present invention has been made in view of the above problems. An object of an aspect of the present invention is to provide a test system and a test method each of which makes it possible to remotely conduct a test in which the shape of a workpiece is also taken into consideration without transporting the workpiece.

Solution to Problem

A test system in accordance with an aspect of the present invention includes a computer, a 3D printer, and a test device. The computer obtains shape data (which indicates a three-dimensional shape of a workpiece) and material data (which indicates a material of the workpiece). The 3D printer forms a structural object (which has the three-dimensional shape that is indicated by the shape data). The test device performs a test on a pseudo workpiece (which is prepared by adding, to the structural object, a test piece made of the material that is indicated by the material data).

A test methods in accordance with an aspect of the present invention includes the steps of: obtaining shape data (which indicates a three-dimensional shape of a workpiece) and material data (which indicates a material of the workpiece); forming a structural object (which has the three-dimensional shape that is indicated by the shape data); and performing a test on a pseudo workpiece (which is prepared by adding, to the structural object, a test piece made of the material that is indicated by the material data).

Advantageous Effects of Invention

An aspect of the present invention makes it possible to remotely conduct a test also in consideration of the shape of a workpiece without transporting the workpiece.

BRIEF DESCRIPTION OF DRAWINGS

FIG. 2 is a flow chart showing a test method in accordance with an embodiment of the present invention.

Figure 1:
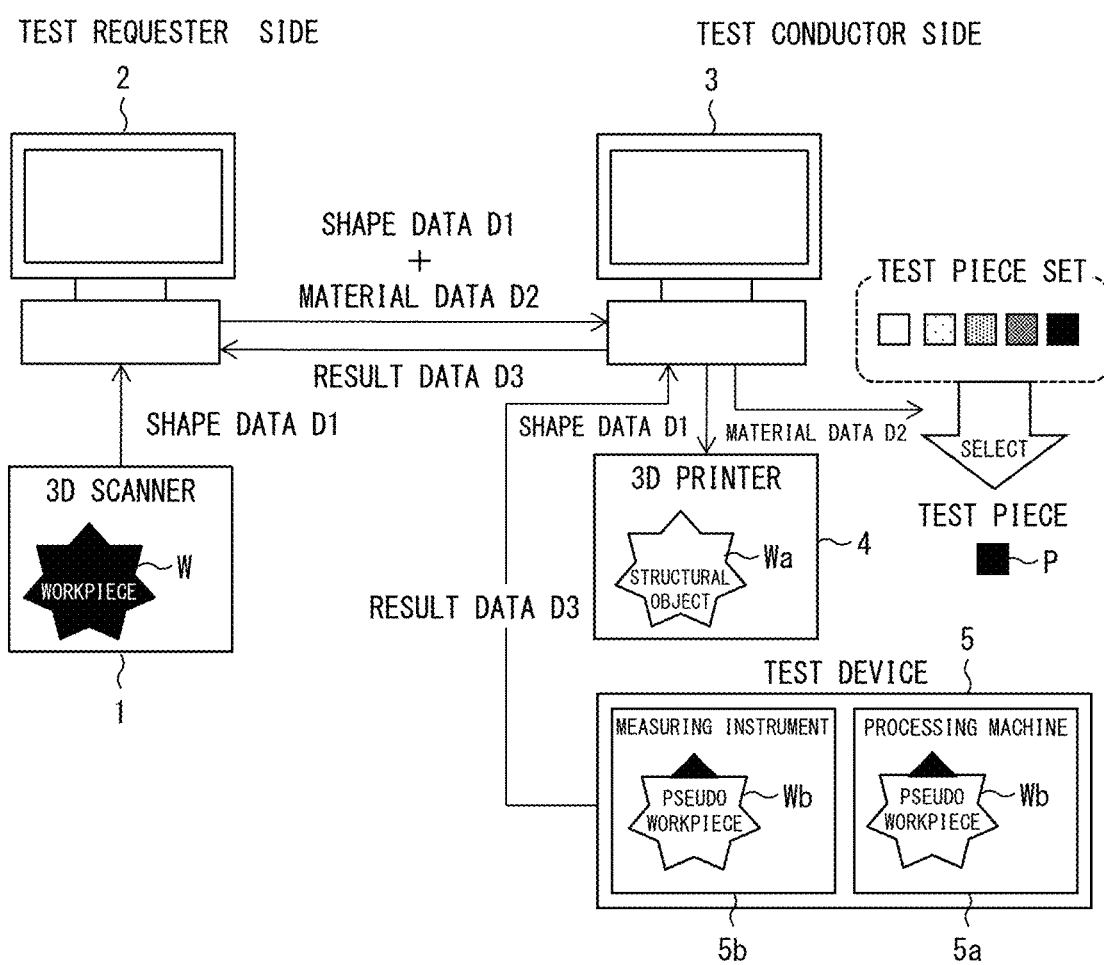
FIG. 1 is a block diagram illustrating a configuration of a test system in accordance with an embodiment of the present invention.

DESCRIPTION OF EMBODIMENTS (Configuration of Test System)

With reference to FIG. 1, the following will discuss a configuration of a test system S in accordance with an embodiment of the present invention. FIG. 1 is a block diagram illustrating the configuration of the test system S.

The test system S includes a 3D scanner 1, a computer 2, another computer 3, a 3D printer 4, and a test device 5, as illustrated in FIG. 1. The 3D scanner 1 and the computer 2 are devices on a test requester (who asks for performing a test) side, whereas the computer 3, the 3D printer 4, and the test device 5 are devices on a test conductor (who conducts the test) side.

The 3D scanner 1 creates shape data which indicates a three-dimensional shape of a workpiece W. The 3D scanner 1 provides the computer 2 with the shape data D1. The test requester inputs, into the computer 2 via a keyboard and/or the like, material data which indicates a material of the workpiece W. The computer 2 provides the computer 3 with the shape data D1 which has been obtained from the 3D scanner 1 and the material data D2 which has been obtained from the test requester.

The computer 3 inputs, into the 3D printer 4, the shape data D1 which has been obtained from the computer 2. The 3D printer 4 forms a structural object Wa which has the three-dimensional shape that is indicated by the shape data D1 having been obtained from the computer 3, that is, forms a structural object Wa which has the same or substantially the same shape as the workpiece W. The material of the structural object Wa is not particularly limited, and may be a metal or a resin. The computer 3 on the test conductor side provides, via a display or the like, a test conductor with the material data D2 which has been obtained from the computer 2 on the test requester side. The test conductor selects, from among a set of test pieces which has been prepared in advance, a test piece P corresponding to the material which is indicated by the material data D2 that has been obtained from the computer 3. It should be noted here that the test piece P corresponding to the material which is indicated by the material data D2 refers to a test piece which is made of a material identical to the material that is indicated by the material data D2, or refers to a test piece which is made of a material that has a property most similar to that of the material indicated by the material data D2, among test pieces that are included in the set of test pieces. Then, the test conductor prepares a pseudo workpiece Wb by adding the test piece P thus selected to the structural object Wa that has been formed by the 3D printer 4 (the test piece P may be embedded in or attached to the structural object Wa). The test device 5 performs a test on the pseudo workpiece Wb and provides the computer 3 with result data D3 which indicates a result of the test.

The computer 3 provides the computer 2 with the result data D3 which has been obtained from the test device 5. The computer 2 provides, via a display or the like, the test requester with the result which is indicated by the result data.

Note that in the present embodiment, the test device 5 is composed of a processing machine 5a and a measuring instrument 5b. The processing machine 5a performs surface processing on the pseudo workpiece Wb. Examples of the processing machine 5a include a blasting device for performing blasting such as shot blasting or micro blasting, a peening device for performing peening such as shot peening or laser peening, a polishing device for performing polishing such as barrel polishing or brush polishing, or a burnishing device for performing burnishing such as roller burnishing. The measuring instrument 5b measures a surface condition of the pseudo workpiece Wb which has been surface-processed. Examples of the measuring instrument 5b include, for example, a measuring instrument for measuring some or all of roughness, hardness, compressive residual stress, and crystal grain size.

As described above, the test system S includes: the computer 3 configured to obtain the shape data D1 which indicates the three-dimensional shape of the workpiece W and the material data D2 which indicates the material of the workpiece W; the 3D printer 4 configured to form the structural object Wa which has the three-dimensional shape that is indicated by the shape data D1; and the test device 5 configured to perform a test on the pseudo workpiece Wb which has been prepared by adding, to the structural object Wa, the test piece P made of the material that is indicated by the material data D2.

Therefore, the test conductor can perform a test with use of the pseudo workpiece Wb which has the same or substantially the same shape as the workpiece W and which is partially made of the same or substantially the same material as the workpiece W. Accordingly, it is possible to remotely conduct a test also in consideration of the shape of the workpiece W without transporting the workpiece W.

Further, the test device 5 of the test system S includes: the processing machine 5a configured to perform surface processing on the pseudo workpiece Wb; and the measuring instrument 5b configured to measure the surface condition of the pseudo workpiece Wb which has been surface-processed.

For this reason, it is possible to remotely conduct a test associated with surface processing also in consideration of the shape of workpiece W, without transporting the workpiece W.

The test system S further includes: the 3D scanner 1 configured to generate the shape data D1; and the computer 2 configured to provide the computer 3 with the shape data D1 and the material data D2 and to also obtain, from the computer 3, the result data D3 which indicates the result of the test.

Therefore, the test requester can easily request a remote test, and can easily know a result of the remote test.

(Flow of Test Method)

With reference to FIG. 2, the following will discuss a flow of a test method M in accordance with an embodiment of the present invention. FIG. 2 is a flowchart illustrating a flow of the test method M.

As shown in FIG. 2, the test method M includes a shape data generating step M1, a material data inputting step M2, a shape/material data providing/obtaining step M3, a structural object forming step M4, a test piece selecting step M5, a pseudo workpiece preparing step M6, a testing step M7, a result data providing/obtaining step M8, and a result data outputting step M9. The shape data generating step M1, the material data inputting step M2, and the result data outputting step M9 are performed on the test requester side, while the structural object forming step M4, the test piece selecting step M5, the pseudo workpiece preparing step M6, and the testing step M7 are performed on the test conductor side.

The shape data generating step M1 is the step of generating the shape data D1 which indicates the three-dimensional shape of the workpiece W. In the present embodiment, the test requester performs the shape data generating step M1 with use of the 3D scanner 1.

The material data inputting step M2 is the step of inputting, into the computer 2, the material data D2 which indicates the material of the workpiece W. In the present embodiment, the test requester performs the material data inputting step by using a keyboard and/or the like.

The shape/material data providing/obtaining step M3 is a step in which the computer 2 provides the computer 3 with the shape data D1 which has been generated in the shape data generating step M1 and the material data D2 which has been inputted in the material data inputting step M2, or in which the computer 3 obtains the shape data D1 and the material data D2 from the computer 2. In the present embodiment, the computer 2 and the computer 3 perform the shape/material data providing/obtaining step M3.

The structural object forming step M4 is the step of forming the structural object Wa which has the shape indicated by the shape data that has been obtained in the shape/material data providing/obtaining step M3. In the present embodiment, the test conductor performs the structural object forming step M4 with use of the 3D printer 4.

The test piece selecting step M5 is the step of selecting, from among a set of test pieces given in advance, a test piece P made of the material that is indicated by the material data which has been obtained in the shape/material data providing/obtaining step M3. In the present embodiment, the test conductor performs the test piece selecting step M5.

The pseudo workpiece preparing step M6 is the step of adding, to the structural object Wa which has been formed in the structural object forming step M4, the test piece P which has been selected in the test piece selecting step M5. In the present embodiment, the test conductor performs the pseudo workpiece preparing step M6.

The testing step M7 is the step of performing a test on the pseudo workpiece Wb which has been prepared in the pseudo workpiece preparing step M6. In the present embodiment, the test conductor performs the testing step M7 with use of the test device 5.

The result data providing/obtaining step M8 is a step in which the computer 3 provides the computer 2 with result data D3 that indicates a result of the test, or in which the computer 2 obtains the result data D3 from the computer 3. In the present embodiment, the computer 2 and the computer 3 performs the result data providing/obtaining step M8.

The result data outputting step M9 is the step of outputting the result data D3 which has been obtained in the result data providing/obtaining step M8. In the present embodiment, the computer 3 performs the result data outputting step M9 with use of a display and/or the like.

Note that in the present embodiment, the testing step 7 includes a processing step M7a and a measuring step M7b. The processing step M7a is the step of performing surface processing on the pseudo workpiece Wb. Examples of surface processing include blasting such as shot blasting or micro blasting, peening such as shot peening or laser peening, polishing such as barrel polishing or brush polishing, or burnishing such as roller burnishing. The measuring step M7b is the step of measuring the surface condition of the pseudo workpiece Wb which has been surface-processed. Examples of the surface condition to be measured include some or all of roughness, hardness, compressive residual stress, and crystal grain size.

As described above, the test method M includes: the shape/material data providing/obtaining step M3 of obtaining the shape data D1 which indicates the three-dimensional shape of the workpiece W and the material data D2 which indicates the material of the workpiece W; the structural object forming step M4 of forming the structural object Wa which has the three-dimensional shape that is indicated by the shape data D1; and the testing step M7 of performing a test on the pseudo workpiece Wb which has been prepared by adding, to the structural object Wa, the test piece P made of the material that is indicated by the material data D2.

Therefore, the test conductor can perform a test with use of the pseudo workpiece Wb which has the same or substantially the same shape as the workpiece W and which is partially made of the same or substantially the same material as the workpiece W. Accordingly, it is possible to remotely conduct a test also in consideration of the shape of the workpiece W without transporting the workpiece W.

Further, the testing step M7 of the test method M includes: the processing step M7a of performing surface processing on the pseudo workpiece Wb; and the measuring step M7b of measuring the surface condition of the pseudo workpiece Wb which has been surface-processed.

For this reason, it is possible to remotely conduct a test associated with surface processing also in consideration of the shape of workpiece W, without transporting the workpiece W.

The test method M further includes: the shape data generating step M1 of generating the shape data D1; the shape/material data providing/obtaining step M3 of providing the shape data D1 and the material data D2; and the result data providing/obtaining step M8 of obtaining the result data D3 which indicates the result of the test.

Therefore, the test requester can easily request a remote test, and can easily know a result of the remote test.

SUPPLEMENTARY NOTE

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

S test system
1 3D scanner
2 computer
3 computer
4 3D printer
5 test device
W workpiece
Wa structural object
Wb pseudo workpiece

The invention claimed is:

1. A test method comprising the steps of:
    obtaining shape data which indicates a three-dimensional shape of a workpiece and material data which indicates a material of the workpiece;
    forming a structural object which has the three-dimensional shape that is indicated by the shape data;
    selecting, from among a set of test pieces given in advance, a test piece made of the material that is indicated by the material data which;
    adding, to the structural object which has been formed in the structural object forming, the test piece which has been selected in the test piece selecting step; and
    performing a test on a pseudo workpiece which has been prepared by adding, to the structural object, a test piece made of the material that is indicated by the material data.

2. The test method according to claim 1, wherein
the step of performing the test includes the steps of:
performing surface processing on the pseudo workpiece; and
measuring a surface condition of the pseudo workpiece which has been surface-processed.

3. The test method according to claim 1, further comprising the steps of:
    generating the shape data;
    providing the shape data and the material data; and
    obtaining result data which indicates a result of the test.

* * * * *